(12) United States Patent
Frota de Souza Filho

(10) Patent No.: US 9,533,357 B2
(45) Date of Patent: Jan. 3, 2017

(54) OPTIMIZED VIBRATION ABSORBER

(71) Applicant: Kennametal Inc., Latrobe, PA (US)

(72) Inventor: Ruy Frota de Souza Filho, Latrobe, PA (US)

(73) Assignee: KENNAMETAL INC, Latrobe, PA (US)

( * ) Notice: Subject to any disclaimer, the term of this patent is extended or adjusted under 35 U.S.C. 154(b) by 263 days.

(21) Appl. No.: 14/319,723

(22) Filed: Jun. 30, 2014

(65) Prior Publication Data

US 2015/0375305 A1 Dec. 31, 2015

(51) Int. Cl.
*B23B 29/02* (2006.01)
*B23B 27/00* (2006.01)

(52) U.S. Cl.
CPC ........... *B23B 29/022* (2013.01); *B23B 27/002* (2013.01); *B23B 27/007* (2013.01); *B23B 2250/16* (2013.01); *B23B 2260/004* (2013.01); *Y10T 408/76* (2015.01)

(58) Field of Classification Search
CPC ...... B23B 29/022; B23B 27/002; B23C 5/003; B23C 2250/16; B23C 2250/04; B23Q 11/0035; B23Q 11/0032; B23Q 11/0039; B23Q 11/10; B23Q 11/12; B23Q 11/06; B23Q 11/02; B23Q 11/00; Y10T 408/76
See application file for complete search history.

(56) References Cited

U.S. PATENT DOCUMENTS

| | | |
|---|---|---|
| 2,051,954 A | 8/1936 | Leland |
| 2,591,115 A | 4/1952 | Austin |
| 3,164,041 A | 1/1965 | Carlstedt |
| 3,207,009 A | 9/1965 | Carlstedt |
| 3,207,014 A | 9/1965 | Carlstedt |
| 3,230,833 A | 1/1966 | Shurtliff |
| 3,242,791 A | 3/1966 | Smith |
| 3,447,402 A | 6/1969 | Ray |
| 3,559,512 A | 2/1971 | Aggarwal |
| 3,582,226 A | 6/1971 | Shurtliff |
| 3,598,498 A | 8/1971 | Holmen |
| 3,643,546 A | 2/1972 | Richter et al. |
| 3,774,730 A | 11/1973 | Maddux |

(Continued)

FOREIGN PATENT DOCUMENTS

| | | |
|---|---|---|
| CN | 103433762 A | 12/2013 |
| GB | 1029675 | 5/1966 |

(Continued)

*Primary Examiner* — Daniel Howell
(74) *Attorney, Agent, or Firm* — Matthew S. Bedsole

(57) ABSTRACT

A tuned or tunable boring tool includes a boring bar defining an elongated cavity therein. A distal end of the boring bar is configured to support a tool or cutting insert. The boring tool further includes a dynamic vibration absorber inserted within the elongated cavity of the boring bar. The dynamic vibration absorber includes a mass that vibrates in conjunction with vibration of the boring bar. The mass has a proximal end and a distal end. The dynamic vibration absorber further includes at least one resilient proximal support positioned adjacent to and supporting the proximal end of the mass and at least one distal resilient support positioned adjacent to and supporting the distal end of the mass. The at least one proximal support and at least one distal support have a different stiffness.

18 Claims, 8 Drawing Sheets

(56) References Cited

U.S. PATENT DOCUMENTS

| | | |
|---|---|---|
| 3,838,936 A | 10/1974 | Andreassen et al. |
| 4,553,884 A | 11/1985 | Fitzgerald et al. |
| 4,817,003 A | 3/1989 | Nagase et al. |
| 5,413,318 A | 5/1995 | Andreassen |
| 5,518,347 A | 5/1996 | Cobb, Jr. |
| 5,700,116 A | 12/1997 | Cobb, Jr. |
| 5,810,528 A | 9/1998 | O'Connor et al. |
| 5,924,670 A | 7/1999 | Bailey |
| 6,443,673 B1 | 9/2002 | Etling et al. |
| 6,619,165 B2 * | 9/2003 | Perkowski ............ B23B 29/022 408/143 |
| 6,935,816 B2 | 8/2005 | Lee et al. |
| 7,234,379 B2 * | 6/2007 | Claesson ............... B23B 27/002 188/380 |
| 7,661,912 B2 * | 2/2010 | Onozuka ............... B23B 29/022 188/322.5 |
| 8,308,404 B2 * | 11/2012 | Ostermann ........... B23B 29/022 408/143 |
| 8,734,070 B2 * | 5/2014 | De Souza Filho ..... B23B 31/02 408/143 |
| 2003/0147707 A1 | 8/2003 | Perkowski |
| 2006/0275090 A1 | 12/2006 | Onozuka |
| 2009/0257838 A1 | 10/2009 | Ostermann |
| 2010/0096228 A1 | 4/2010 | Digernes et al. |
| 2012/0003055 A1 | 1/2012 | Sasaki |

FOREIGN PATENT DOCUMENTS

| | | | | |
|---|---|---|---|---|
| GB | 1179217 | | 1/1970 | |
| GB | 1306157 | | 2/1973 | |
| GB | 2322684 A | * | 9/1998 | .......... B63B 39/005 |
| JP | 2000308941 A | * | 11/2000 | |
| JP | 2005186240 A | * | 7/2005 | |
| JP | 2011011276 A | * | 1/2011 | |
| SU | 663493 A2 | | 5/1979 | |
| SU | 1093435 A | * | 5/1984 | |
| WO | WO 2015082361 A1 | * | 6/2015 | ......... B23Q 11/0035 |
| WO | WO 2015082362 A1 | * | 6/2015 | ......... B23Q 11/0035 |

* cited by examiner

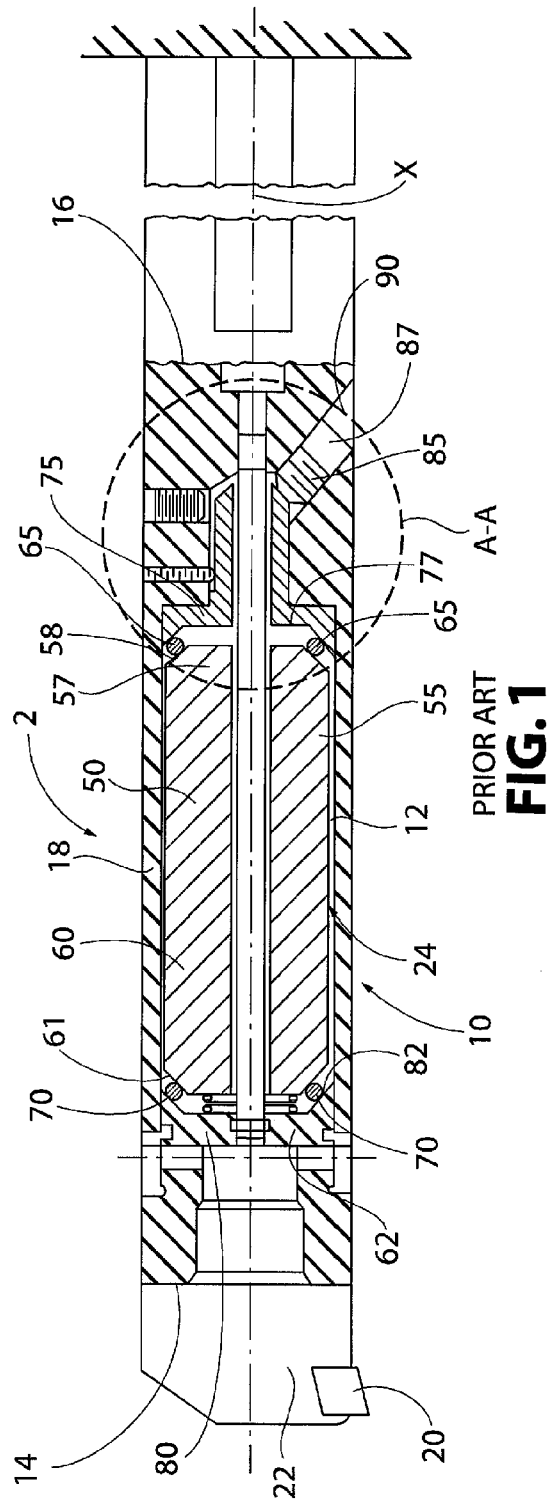
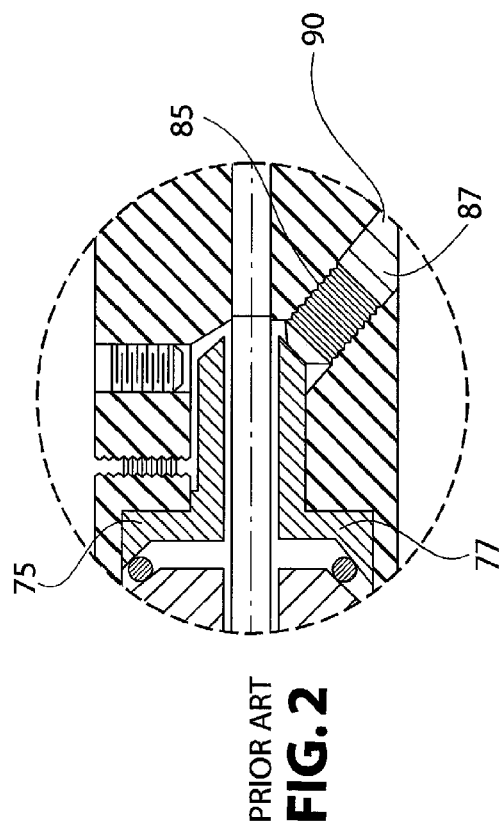
PRIOR ART
FIG. 1
PRIOR ART
FIG. 2

OPTIMIZED VIBRATION ABSORBER

BACKGROUND OF THE INVENTION

Field of the Invention

This invention relates to a tuned or tunable boring tool for suppressing vibrations caused in machining processes and, more particularly, to a tuned or tunable boring tool that utilizes a dynamic vibration absorber tuned for reducing vibration of a vibrating boring bar at multiple natural frequencies or vibration modes.

Description of Related Art

During a metalworking operation, there is relative motion between a workpiece and a cutting tool being urged against the workpiece. Specifically, the surface finish left on the workpiece by a previous pass of the cutting tool creates variation in chip thickness that, in turn, creates fluctuation of the cutting force magnitude. The relative motion between the workpiece and the tool is magnified by this fluctuation of the cutting force and may lead to an unstable condition known as chatter. Chatter is an example of self-excited vibration. As a result of this vibration, a poor quality surface finish and an out-of-tolerance finished workpiece may be produced.

Chatter may be especially problematic when the cutting tool is coupled to an elongated boring bar. A boring bar is essentially a cantilevered member which is anchored at one end and attached to the cutting tool at the other end. Boring bars are conventionally formed from a metal material, such as carbon steel. To reduce vibrations of the boring bars, cutting parameters such as speed and depth of cut may be reduced, decreasing the metal removal rate. However, this approach interferes with production output leading to low productivity.

Numerous attempts to eliminate boring bar vibration are known. One method for reducing vibration is using a boring bar fabricated from a stiffer material, such as carbide (e.g., tungsten carbide). However, carbide boring bars are more expensive than conventional steel bars. Furthermore, with carbide boring bars, although chatter and vibration are reduced by the inherently high stiffness of the carbide bar, vibration may still build to an unacceptable level. Additionally, carbide is fairly brittle and a minor impact upon the boring bar during use or setup may inadvertently damage the bar. A carbide boring bar extending between a steel adapter and steel tip portion is disclosed in U.S. Pat. No. 6,935,816 to Lee et al.

Another attempt to reduce vibration in boring bars is by attaching a dynamic vibration absorber mechanism to or within the boring bar. The dynamic vibration absorber may be sized during manufacturing to vibrate at a particular predetermined frequency to cancel vibration of the cantilevered bar. The dynamic vibration absorber may also include various mechanisms for tuning the bar, for particular applications.

A dynamic vibration absorber for use in a tunable boring bar, comprised of a cylindrical mass of a high-density material supported on resilient bushings, is disclosed in U.S. Pat. No. 3,774,730. When optimally tuned, the mass oscillates in response to vibration produced in the boring bar to cancel out vibration. The absorber may be tuned to accommodate the boring bar for the changes in the length of the boring bar and the weight of the cutting tool connected at the end of the bar. Such an adjustment is made by longitudinally urging pressure plates at opposing ends of the cylindrical mass, thereby compressing the rubber bushings against the mass, which alters the force of the rubber supports against the mass. Generally, the process of tuning the boring bar is easier for boring bars having higher natural frequencies where smaller tuning masses can be applied. Therefore, shorter and stiffer bars are typically easier to tune than longer, more flexible bars.

Tunable boring bars are typically formed from materials that can be machined, such as carbon steel, so that the bar can be fitted to accommodate the vibration absorption mechanism. Therefore, tunable boring bars generally are not made from stiffer materials, such as carbide, which cannot be machined through conventional means. In addition to tunable boring bars, some boring bars are designed with internal vibration absorber mechanisms that are not tunable. These anti-vibration bars will be referred to as AVB bars.

For both tunable and AVB bars, the dynamic vibration absorber is configured to cancel or minimize vibration of the bar at the first natural frequency of the bar, referred to hereinafter as the first mode. However, when vibration of the first mode of the boring bar is effectively canceled or minimized, the second natural frequency, referred to hereinafter as the second mode, may become dominant and cause chatter during cutting, even in light duty applications. The above-described tunable boring bars and AVB bars do not address vibration of the second mode or higher order modes.

Therefore, conventional tunable boring bars and AVB bars, as are known in the prior art, may not produce satisfactory performance for boring bars with narrower diameters or longer lengths. This limitation is problematic since, for certain cutting applications, narrow, long-length boring bars are particularly desirable. Therefore, there is a need for a tuned or tunable boring bar that can be optimized to cancel or minimize vibration of the boring bar at both the first mode and subsequent modes of vibration.

SUMMARY OF THE INVENTION

A tuned or tunable boring tool including a dynamic vibration absorber for minimizing or canceling vibration of a vibrating boring tool at multiple natural frequencies or modes is provided. The tuned or tunable boring tool includes a boring bar having a distal portion configured to support a tool, a proximal portion configured for attachment to a support structure of a metalworking machine, and a tubular body extending between the proximal portion and the distal portion, having an elongated cavity therein. The boring tool further includes a dynamic vibration absorber inserted within the elongated cavity of the boring bar. The dynamic vibration absorber includes a mass that vibrates in conjunction with vibration of the boring bar. The mass has a proximal end, positioned adjacent to the proximal portion of the boring bar, and a distal end, positioned adjacent to the distal portion of the boring bar. The dynamic vibration absorber further includes at least one proximal support positioned adjacent to and supporting the proximal end of the mass and at least one distal support positioned adjacent to and supporting the distal end of the mass. The at least one proximal support and at least one distal support have different stiffnesses.

According to another aspect of the invention, a method of forming a tuned or tunable boring tool is provided. The method includes the step of providing a boring bar having a distal portion configured to support a tool, a proximal portion configured for attachment to a support structure of a metalworking machine, and a tubular body extending between the proximal portion and the distal portion, having an elongated cavity therein. The method further includes the step of providing a tuned or tunable vibration absorber. The vibration absorber includes a mass that vibrates in conjunction with vibration of the boring bar. The mass has a proximal end, positioned adjacent to the proximal portion of the boring bar, and a distal end, positioned adjacent to the distal portion of the boring bar. The vibration absorber further includes at least one proximal support, which is resilient, positioned adjacent to and supporting the proximal end of the mass, wherein the at least one proximal resilient support has a stiffness, and at least one distal resilient support, which is resilient, positioned adjacent to and supporting the distal end of the mass, wherein the at least one distal support has a stiffness. The stiffness of the proximal support is different from the stiffness of the distal support. The method further includes the steps of: mounting the vibration absorber into the cavity of the boring bar; mounting a cutting tool to the distal end of the boring bar; and securing the proximal end of the boring bar to a mounting structure of a metalworking machine.

BRIEF DESCRIPTION OF THE DRAWINGS

Some of the advantages and features of the preferred embodiments of the invention have been summarized hereinabove. These embodiments, along with other potential embodiments of the device, will become apparent to those skilled in the art when referencing the following drawings in conjunction with the detailed descriptions as they relate to the figures.

FIG. 1 is a schematic drawing of a tunable boring tool, as is known in the prior art;

FIG. 2 is an expanded view of the boring tool of FIG. 1 from the encircled area labeled A-A, as is known in the prior art;

DESCRIPTION OF THE INVENTION

Figure 3:
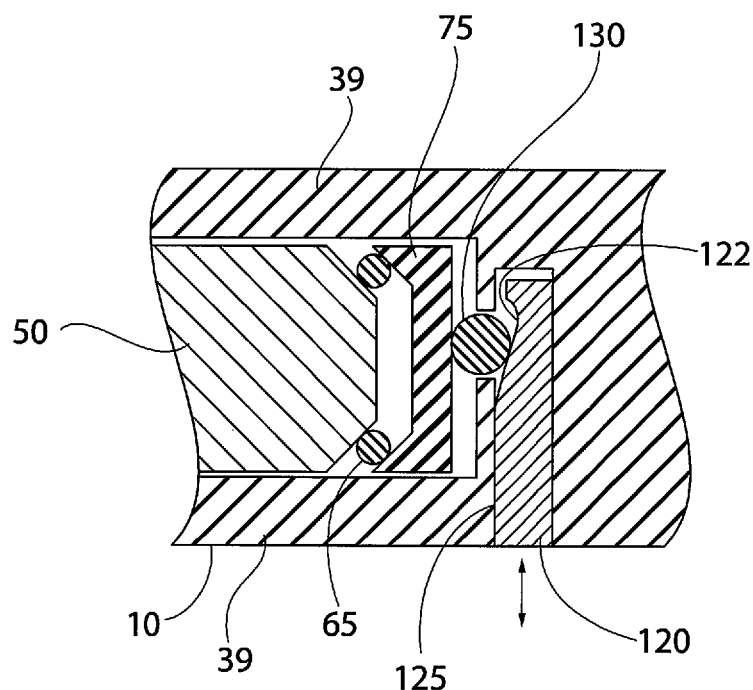
FIG. 3 is an expanded view of another embodiment of a tunable boring tool, as is known in the prior art.

For purposes of the description hereinafter, spatial orientation terms, if used, shall relate to the referenced embodiment as it is oriented in the accompanying drawing figures or otherwise described in the following detailed description. However, it is to be understood that the embodiments described hereinafter may assume many alternative variations and embodiments. It is also to be understood that the specific devices illustrated in the accompanying drawing figures and described herein are simply exemplary and should not be considered as limiting.

The present invention is directed to a vibration absorber configured for use with a tuned or tunable boring tool. The vibration absorber is a dynamic vibration absorber that oscillates in response to vibration of the boring bar. To facilitate discussion, a boring tool 2, including the vibration absorber and boring bar, as is known in the prior art, will now be described.

With reference to FIGS. 1 and 2, a boring tool 2, as is known in the prior art, is illustrated. The boring tool 2 includes a boring bar 10 with a central cavity 12 extending inwardly from the distal end 14 of the boring bar 10. The boring bar 10 includes a body 18, such as a steel shank, extending between a proximal end 16 and distal end 14 of the bar 10. The proximal end 16 of the boring bar 10 may be fixedly connected to a supporting structure, such as a supporting structure of a metalworking machine (not shown). Thus, the boring bar 10 is a cantilevered beam, in which the proximal end 16 is secured to the supporting structure, and the distal end 14 is free. A cutting tool, such as a cutting insert 20, is mounted in a conventional manner to a boring bar head 22 positioned at the distal end 14 of the body 18. Steel boring bars 10 are commercially available from a number of manufacturers, including Kennametal Inc., of Latrobe, Pa. Kennametal manufactures steel, tunable boring bars with a diameter of about 25 mm to 100 mm. Without a vibration absorber, the acceptable cantilevered length of a boring bar, while dependent on the specific application, is generally between 6 and 10 times the outer diameter of the bar 10.

As discussed herein, use of the boring bar 10 on a workpiece in a metalworking operation will produce vibrations that may deteriorate the surface finish and dimensional tolerance of the workpiece. For this reason, the boring tool 2 is provided with a vibration absorber, such as a tunable dynamic vibration absorber 24, that dampens the vibrations generated in the boring bar 10.

The tunable dynamic vibration absorber 24 is mounted in the central cavity 12 of the body 18. The vibration absorber 24 includes a generally cylindrical mass 50 having a proximal end 57 and a distal end 62. Each end 57,62 has an outwardly facing conical surface 58, 61. A proximal resilient support 65 and a distal resilient support 70 circumscribe the conical surface 58 on the proximal end 57 and the conical surface 61 on the distal end 62, respectively, of the absorber mass 50. The supports 65, 70 may be annular, such as o-rings, or partially annular structures.

Throughout the specification, reference will be made to support 65 and support 70, as well as variation thereof. In all cases it should be understood that each of these is a resilient support formed from a resilient material, such as a natural or synthetic elastomer. A proximal pressure plate 75 and a distal pressure plate 80 are positioned within the central cavity 12 adjacent to the end portions 57, 62 of the absorber mass 50. The proximal pressure plate 75 has an inwardly facing conical surface 77 while the distal pressure plate 80 also has an inwardly facing conical surface 82. Each pressure plate 75,80 surrounds the respective support 65,70 such that the inwardly facing conical surfaces 77,82 of the pressure plates 75, 80 urge each support 65,70 against the respective conical surface 58,61 of the proximal end 57 and the distal end 62 of the absorber mass 50.

Each pressure plate 75, 80 is at least laterally supported within the cavity 12. As illustrated in FIG. 1, pressure plate 75 is slidably supported with and pressure plate 80 is fixed within the cavity 12.

The proximal pressure plate 75 is movable within the central cavity 12 along the longitudinal axis X. A positioning member, such as an adjusting screw 85, may be used to adjust the compression of the supports 65,70 against the absorber mass 50. The adjusting screw 85 extends through a bore 90 from the outer surface of the boring bar 10 to contact the proximal pressure plate 75. The adjusting screw 85 is threadably mated with the bore 90 such that the rotation of the adjusting screw 85 at a screw head 87 urges a contact end of the adjusting screw 85 against or away from the proximal pressure plate 75, thereby displacing the proximal pressure plate 75 along the longitudinal axis X to increase or decrease the compression of the supports 65,70. To tune the subject boring bar 10, an operator monitors the vibration of the boring bar 10 and tightens or loosens the adjusting screw 85, thereby adjusting the force of the supports 65,70 against the absorber mass 50. Alternatively, it is also possible to predefine the amount of compression on the supports 65,70 against the absorber mass 50 necessary to minimize vibration under different tool conditions. In this manner, a machine operator may adjust the compressive force of the supports 65,70 to predetermined levels for tuning.

Alternate mechanisms for tuning the dynamic vibration absorber of the boring tool 2 are also known. For example, with reference to FIG. 3, a further embodiment of a boring tool including a boring bar 10 and vibration absorber is illustrated, which uses a ball 130 or support rather than an adjustable screw to modify the position of the mass 50. The mechanism for adjusting or tuning the boring bar 10 includes a wedge 120 that is radially positioned within a hole 125 or slot extending through a cavity wall 39 of the boring bar 10. A ramp 122 on the wedge 120 longitudinally displaces the ball 130 against the surface of a moveable pressure plate 75, thereby urging the moveable pressure plate 75 against the elastomer supports 65 to adjust compression on the supports 65. As in previously described embodiments, adjusting the compressive force of the elastomer supports 65, 70 adjusts the vibration frequency of the mass 50 thereby tuning the boring tool 2 to minimize vibration for boring bars 10 of particular lengths.

Having generally described the structure and operation of a boring tool 2 and dynamic vibration absorber 24 as is known in the prior art, the dynamic vibration absorber of the present invention will now be described in detail.

Figure 4:
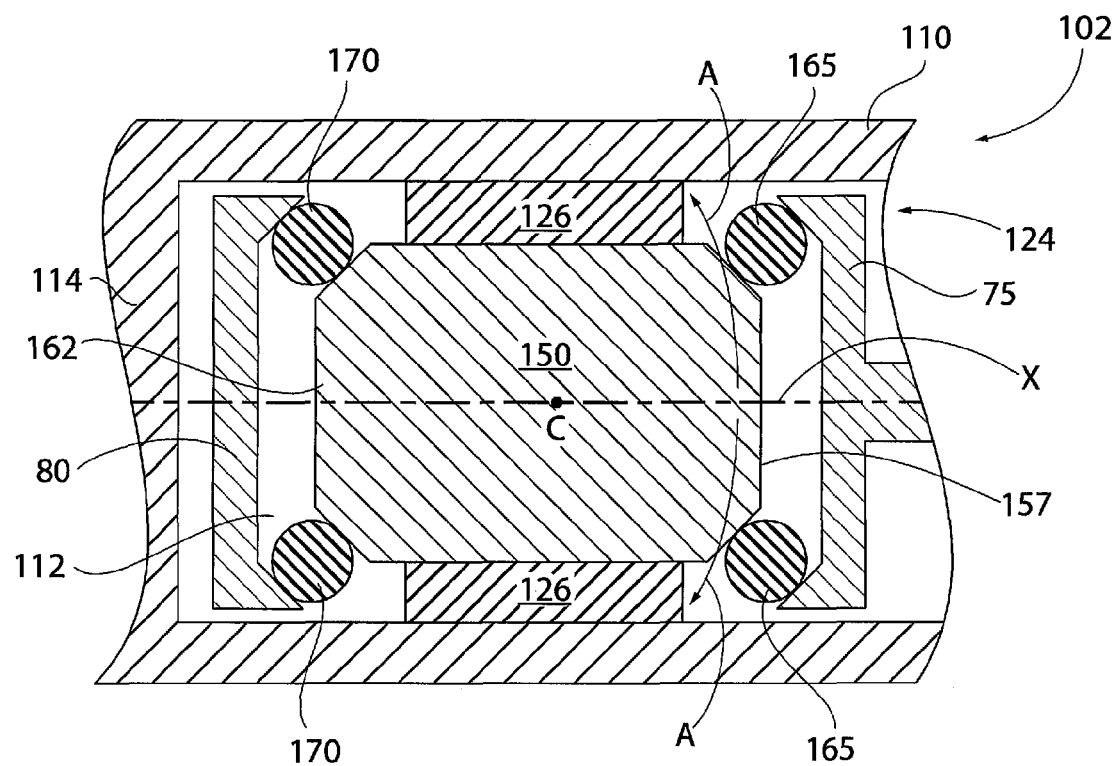
FIG. 4 is schematic drawing of a cross-section of an embodiment of a boring tool.

With reference to FIG. 4, a portion of a tunable boring tool 102 including a boring bar 110 and dynamic vibration absorber 124 is illustrated. A cutting tool or cutting element 20 (shown in FIG. 1) may be attached to the distal end 114 of the boring bar 110. As in the boring tools of FIGS. 1-3, the dynamic vibration absorber 124 includes a mass 150 positioned in a cavity 112 of the boring bar 110. The center C of the mass 150 generally extends along the longitudinal axis X of the boring bar 110. Vibration of the boring bar 110 excites the mass 150, which is intended to be tuned to vibrate out of phase with the boring bar 110, thereby minimizing or cancelling vibration of the boring bar 110. The mass 150 is held in place by one or more proximal supports 165, positioned adjacent to the proximal end 157 of the mass 150, and one or more distal supports 170, positioned adjacent to the distal end 162 of the mass 150. In certain embodiments, the supports 165,170 are annular o-rings configured to circumscribe the ends 157,162 of the mass 150. However, as previously mentioned, each support is resilient. The proximal support 165 may be formed from a first elastic material. The distal support 170 may be formed from a second elastic material. As will be described hereinafter, the first elastic material and the second elastic material may be materials having the same physical properties, such as the modulus of elasticity. Alternatively, the first and second elastic materials may be different materials having different physical properties. The supports 165,170 may also be different shapes and sizes. Additionally, the distal end 162 of the mass 150 may have a greater number of supports 170 than the proximal end 157.

Pressure plates 75,80 move along the longitudinal axis X to compress the supports 165,170 against the mass 150. As in previously described dynamic absorbers known in the prior art, adjusting the position of the pressure plates 75, 80 adjusts the compression of the supports 165,170 against the mass 150. Adjusting the compression of the supports 165, 170 changes the vibration frequency of the mass 150 to cancel or minimize vibration of the first mode of the boring bar 110.

In some embodiments, the mass 150 may be surrounded by various dampening materials to further optimize dampening of the first mode. For example, as illustrated in FIG. 4, the mass 150 may be surrounded by a layer 126 of vibration absorbing material that dampens vibration of the mass 150. The mass 150 may also be surrounded by certain flowable materials, such as natural or synthetic oil, for further vibration dampening.

Briefly stated, the first mode of vibration for a cantilever, such as a boring bar, is simple wherein the free end of the cantilever essentially oscillates back and forth. This first mode of vibration has the greatest influence upon displacement of the bar and it is this motion that prior art anti-vibration bars have addressed. However, the second mode of vibration may also be significant and the second mode motion is more complex with a stationary node part way along the length of the vibrating bar. The inventor has discovered that by introducing resilient supports 165, 170, each with different stiffnesses, the vibration characteristics of the mass 150 may be altered to reduce or eliminate the displacement of the bar caused by the second mode of vibration which was previously imparted to the bar when the stiffnesses of the resilient supports were equal. Therefore, in addition to canceling or minimizing vibration of the first mode, the supports 165, 170 of the dynamic vibration absorber 124 are configured so that movement of the mass 150 also cancels or minimizes the second mode of the vibrating bar 110. To achieve this the mass 150 and supports 165,170 are configured so that, during vibration, the displacement of the proximal end 157 of the mass 150 is greater than the displacement of the distal end 162 of the mass 150. To obtain this result, the distal support 170 is formed and positioned to restrict motion of the mass 150 more than the proximal support 165.

One means for restricting motion of the distal end 162 of the mass 150 is by making the stiffness of the distal support 170 different from the stiffness of the proximal support 165. Since stiffness of a body is directly proportional to the modulus of elasticity of the body material, this result may be obtained by forming the distal support 170 from a material having a different modulus of elasticity than the material of the proximal support 165. Since stiffness is also related to shape and size, this result may also be obtained by using a proximal support 165 and a distal support 170 with different shapes and/or sizes.

With continued reference to FIG. 4, the proximal support 165 and distal support 170 are substantially similar in size and shape. Therefore, to obtain the above-described difference in range of motion between the proximal end 157 and distal end 162 of the mass 150, the first material (that forms the proximal support 165) has a lower stiffness than the second material (that forms the distal support 170). For example, the distal support 170 may be formed from a material having a stiffness 1.5 to 2.5 times greater than the stiffness of the proximal support 165. In certain embodiments, the distal support 170 may be a synthetic elastomer, such as a fluoropolymer. Other natural or synthetic elastomeric materials may also be used within the scope of the invention. As an example, the stiffness of the resilient supports may be in the range of 40-90 Shore hardness.

The stiffness of the supports 165,170 is chosen based on the amount of motion needed so that the mass 150 effectively counteracts or cancels the second mode vibration of the bar 110. In other embodiments, differences in the shape or size of the supports 165,170 may be used to obtain similar results. For example, the distal support 170 may have the shape of a circle while the proximal support 165 may be an oval to provide different stiffnesses.

In use, the vibration absorber 124 is inserted in the cavity 112 of the boring bar 110. The proximal end 116 of the boring bar 110 is mounted to a frame or support. A cutting tool 20 (shown in FIG. 1) is attached to the free or distal end 114 of the boring bar 110. When the cutting tool 20 is actuated and brought into contact with a workpiece, the boring bar 110 may chatter or vibrate. The absorber mass 150 of the dynamic vibration absorber 124 vibrates at a frequency close to the frequency of the most dominant mode of the vibrating boring bar 110. Specifically, the mass 150 oscillates back and forth in conjunction with the bar 110 resulting in vibration of the mass 150 sufficient to counteract the first mode vibration of the bar.

In a second mode of vibration, in the region of the mass 150, the bar 110 may experience a relative rocking motion with respect to the proximal end 157 and the distal end 162 of the mass 150. As a result, the motion of the bar 110 is counteracted by the mass 150.

The vibration absorber 124 depicted in FIG. 4 is a vibration absorber 124 for use with a tunable boring bar 110. The vibration absorber 124 may be tuned using one of the tuning mechanisms illustrated in FIGS. 1-3 to increase or decrease compression of the supports 165,170 against the mass 150. However, as will be appreciated by one having ordinary skill in the art, the vibration absorber 124 may also be used with a pre-tuned or AVB boring bar to cancel or minimize vibration for a bar of a specific length, diameter, and material composition. In that case, the compression of the supports 165,170 and position of the pressure plates 75,80 is predetermined. The pre-tuned absorber 124 effectively cancels or minimizes vibration for a particular boring bar utilized within a range of pre-determined operating conditions.

Figure 5:
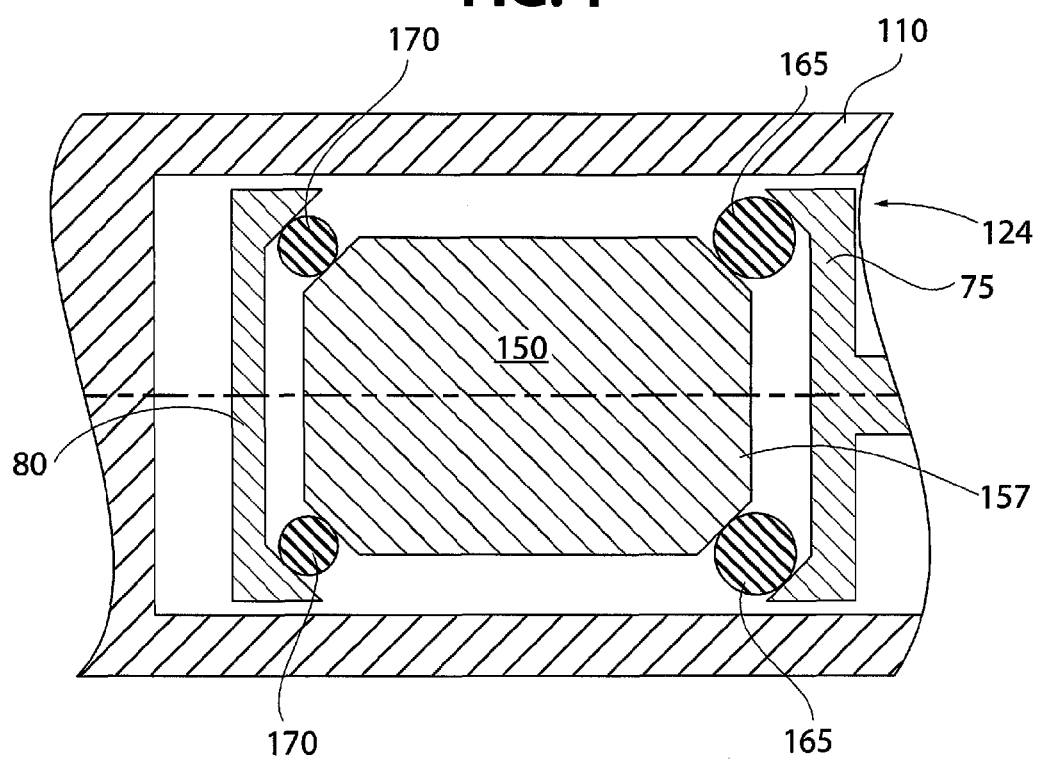
FIG. 5 is s schematic drawing of a cross-section of another embodiment of a boring tool.

With reference to FIG. 5, another embodiment of the dynamic vibration absorber 124 optimized to minimize or cancel the second mode of the vibrating boring bar 110 is illustrated. As in the previously described embodiment, the dynamic absorber 124 includes a vibrating mass 150 supported between at least one proximal support 165 and at least one distal support 170. The supports 165,170 are compressed against the ends of the mass 150 by respective pressure plates 75,80. However, unlike the previously described embodiment, the proximal support 165 is a different size than the distal support 170. Specifically, the distal support 170 has a greater stiffness because it has a smaller cross-sectional area than that of the proximal support 165. As a result, the distal support 170 limits the range of displacement of the distal end 162 of the mass 150 to an amount less than the proximal support 165 limits the range of displacement of the proximal end 157 of the mass 150. Stated differently, the range of motion of the distal end 162, in general, is less than the range of motion of the proximal end 157. Advantageously, in this embodiment, the supports 165,170 may be formed from the same or similar materials. It is not necessary to choose materials having a different modulus of elasticity to optimize vibration of the absorber 124 and mass 150.

Figure 6:
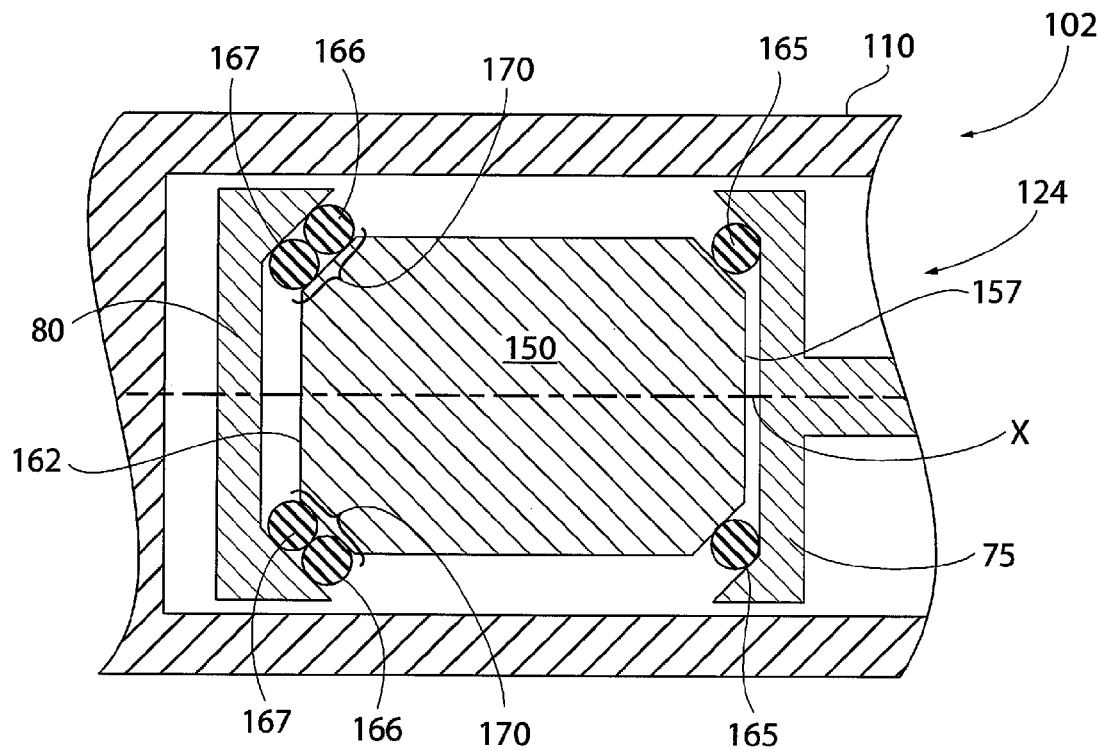
FIG. 6 is a schematic drawing of a cross-section of another embodiment of a boring tool.

With reference to FIG. 6, in another embodiment of the dynamic vibration absorber 124, the mass 150 is supported by more than one distal support 170. Specifically, the absorber 124 includes two annular structures, such as a first o-ring 166 and a second o-ring 167, positioned adjacent to the distal end 162 of the mass 150. The two rings 166,167 may be positioned in a side-by-side orientation. As in previously described embodiments, a single proximal support 165, such as a single o-ring, is positioned on the other side of the mass 150 adjacent to the proximal end 157. In certain embodiments, the two rings 166,167 and proximal support 165 may be the same size and shape, and formed form the same material. However, the total stiffness of the distal support 170, namely the two rings 166,167, is greater than the stiffness of the single o-ring of the proximal support 165.

Figure 6A:
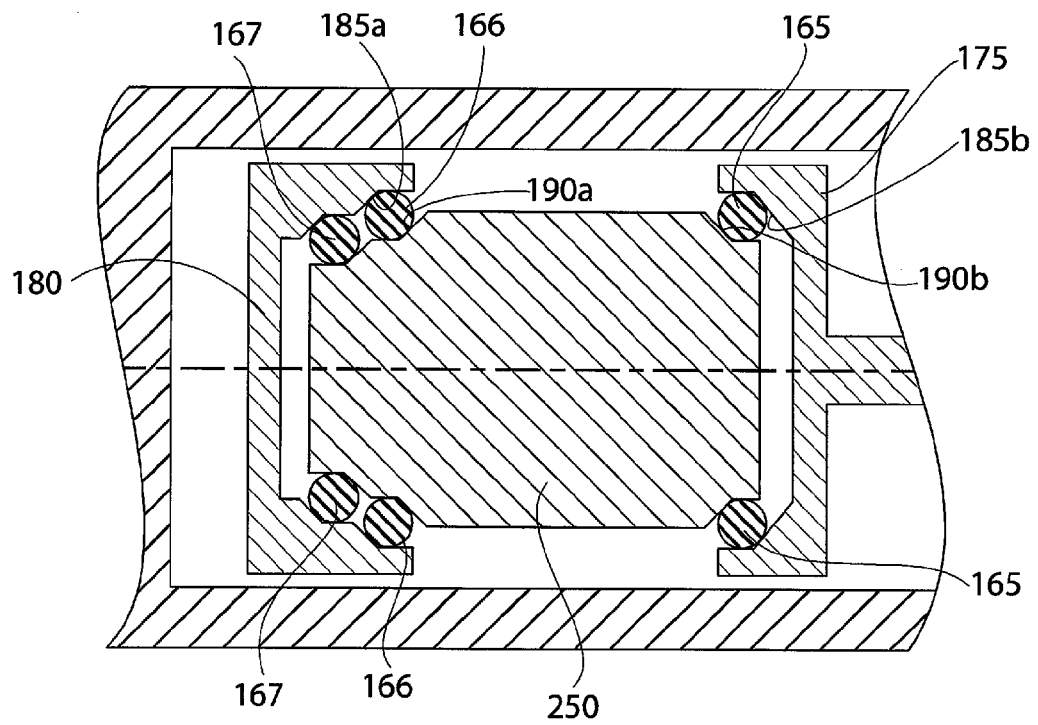
FIGS. 6A, 6B, and 6C are schematic drawings similar to FIG. 6 but illustrating different configurations for securing the supports between the pressure plates and mass.
Figure 6B:
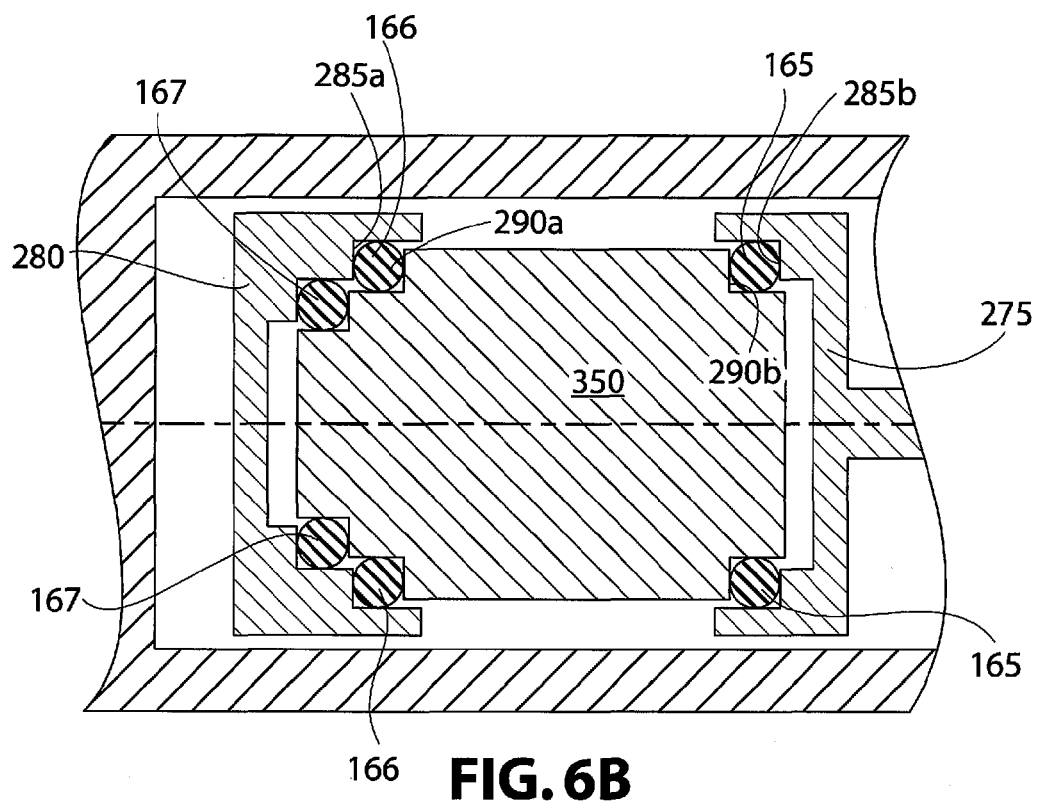
Figure 6C:
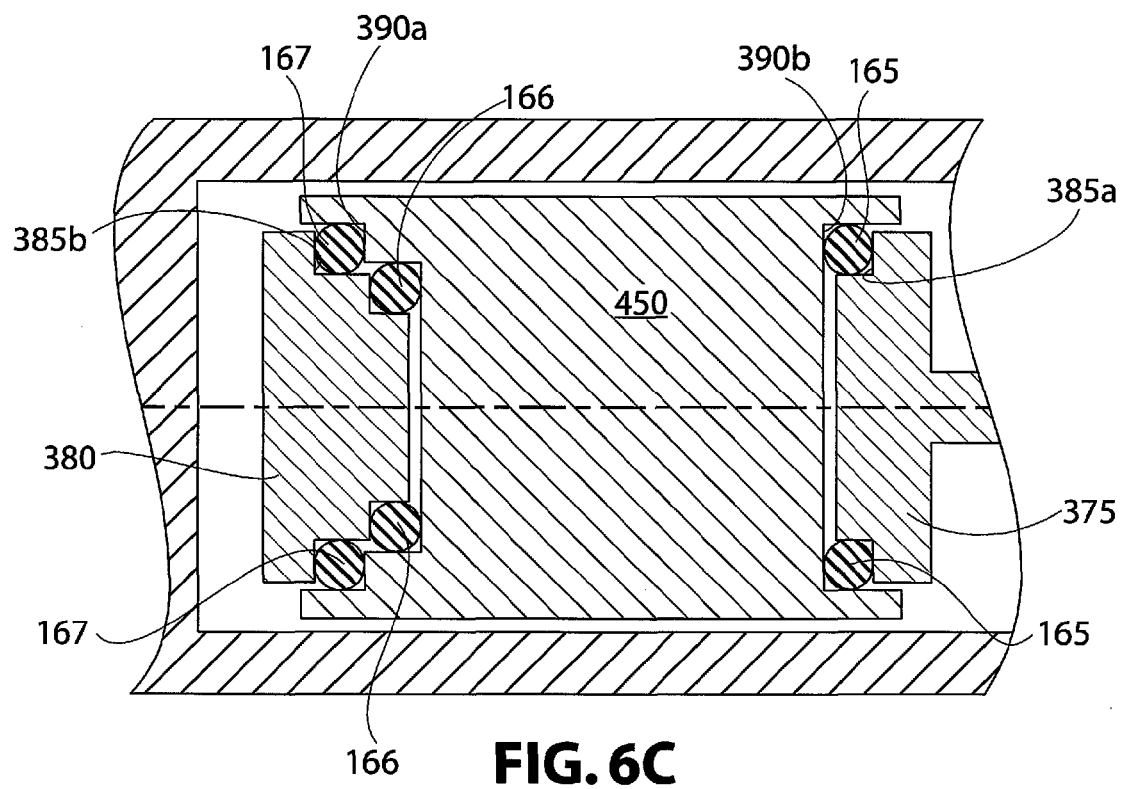

So far the o-rings 166, 167 have been illustrated as being supported by single beveled surfaces between the pressure plates 75, 80 and the mass 150. FIGS. 6A, 6B, and 6C illustrate arrangements identical to that of FIG. 6 but with modifications to the configurations used to capture the supports 165, 166, 167.

FIG. 6A illustrates an arrangement whereby stepped beveled surfaces 185a, 185b of the pressure plates 175, 180 engage the supports 165, 166, 167 against opposing stepped beveled surfaces 190a, 190b of the mass 250. FIG. 6B illustrates an arrangement whereby stepped orthogonal surfaces 285a, 285b of the pressure plates 275, 280 engage the supports 165, 166, 167 against opposing orthogonal surfaces 290a, 290b of the mass 350. In each of the arrangements in FIG. 6A and FIG. 6B, the surfaces surrounding the supports 165, 166, 167 capture the supports 165, 166, 167 to allow compression but restrict motion of the supports 165, 166, 167. Essentially, the stepped surfaces 285a, 285b of the pressure plates 275, 280 cover and urge the supports 165, 166, 167 against the stepped surfaces 290a, 290b of the mass 350. FIG. 6C illustrates as arrangement similar to that of FIG. 6B but reversed such that now the stepped surfaces 390a, 390b of the mass 450 cover the supports 165, 166, 167 against the stepped surfaces 385a, 385b of the pressure plates 375, 380.

Having generally described the structure of the invented boring bar and dynamic vibration absorber, the performance benefits of a dynamic vibration absorber optimized to cancel or minimize vibration of the second mode will now be discussed. More specifically, the present inventor has recognized that when the primary or first mode of a cantilever beam, such as a boring bar, is effectively dampened by a dynamic vibration absorber, the vibration of the second mode may become more significant or even dominant. Since the total amplitude of vibration of the bar is the summation of the amplitude from several modes, it may also be necessary to address vibration of the bar at the second mode to reduce chatter and improve performance.

Figure 7:
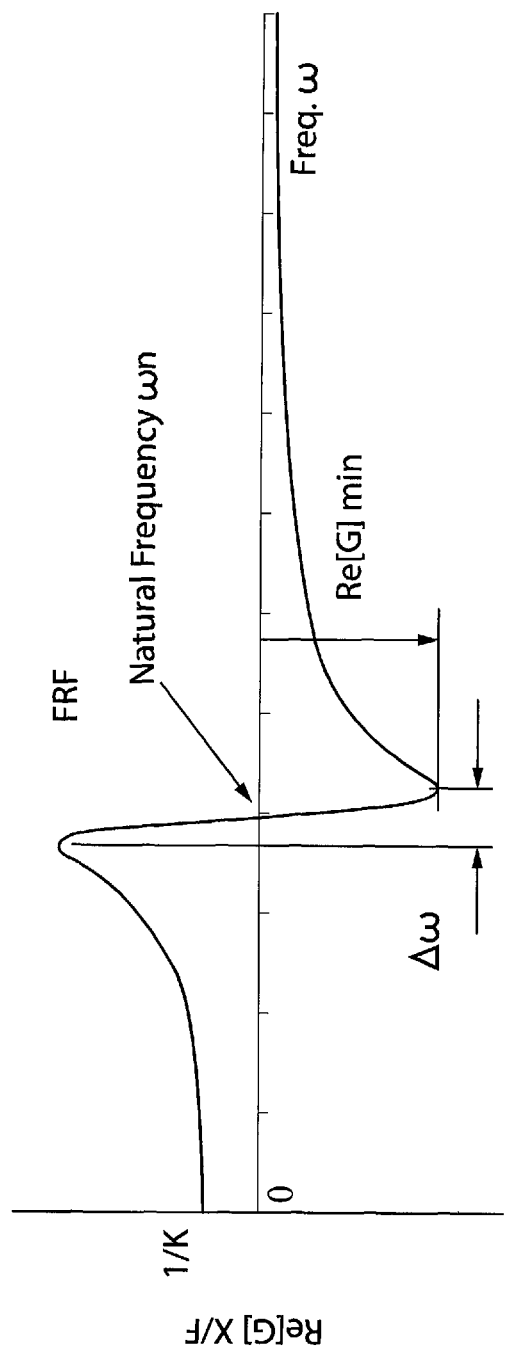
FIG. 7 is a line graph depicting the Frequency Response Function (FRF) for a vibrating bar, as is known in the prior art.

This principle is illustrated in FIG. 7, which depicts the first mode frequency response for a cantilever beam vibrating at the natural frequency. The equation for the minimum (Re[G]$_{min}$) and/or maximum (Re[G]$_{max}$) frequency response function (FRF) or transfer function of a vibrating bar, is reproduced below:

$$\text{Re}[G]_{max} = \frac{1}{4K\zeta(1-\zeta)} \text{ at } \omega = \omega_n(1-\zeta); \text{ and}$$

-continued $$\text{Re}[G]_{min} = -\frac{1}{4K\zeta(1+\zeta)} \text{ at } \omega = \omega_n(1+\zeta).$$

A graphical representation of the FRF or transfer function is illustrated in FIG. 7.

The transfer function characterizes the dynamic response of a system in the frequency domain. It is a complex function that can be represented by real and imaginary components, or, alternatively, as amplitude and phase.

The minimum value of the real part of the transfer function ($\text{Re}[G]_{min}$) can be used to predict the dynamic stability of the boring bar during machining. Similarly, the maximum chip width (or depth of cut) for stable cut can be calculated from the equation:

$$b_{lim} = \frac{1}{2K_s\mu \text{Re}[G]_{min}},$$

wherein
$K_s$ is the material cutting coefficient, $\mu$ is the force orientation factor, and $\text{Re}[G]_{min}$ is the value of the negative peak of the real component of the FRF.

By increasing the depth of cut, the metal removal rate can be increased, maximizing productivity. Therefore, it is desirable that the absolute value of $\text{Re}[G]_{min}$ be minimized.

The absolute value of $\text{Re}[G]_{min}$ may be minimized by adjusting the static stiffness K of the bar. Stiffness is defined as the force required to bend or deform a material a particular amount $$\left(\text{i.e., } \frac{\text{Force}}{\text{Displacement}}\right).$$

The dampening ratio is $\zeta$, which is equal to $$\frac{\Delta\omega}{2\omega_n}.$$

In the dampening ratio equation, $\Delta\omega$ is the difference in frequency between the frequency at which the maximum and minimum amplitude occur, specifically the difference in frequency between when $\text{Re}[G]_{max}$ and $\text{Re}[G]_{min}$ occur. The natural frequency of the bar is $\omega_n$. As can be seen from the $\text{Re}[G]_{min}$ equation, increasing the dampening ratio $\zeta$ for a vibrating cantilevered beam reduces the absolute value of the frequency response ($\text{Re}[G]_{min}$). Including materials within the vibrating bar that are capable of absorbing vibration energy, such as the vibration absorbing layer and high viscosity fluid discussed above, reduces the dampening ratio for the bar. In either case, reducing the absolute value of $\text{Re}[G]_{min}$ means that the amplitude of vibration of the first mode is effectively addressed. However, when a second order system for a vibrating cantilever beam is considered, the frequency response function includes two minimum values. As described above, the amplitude of the second mode is addressed by allowing the mass 150 of the dynamic vibration absorber 124 to oscillate such that the relative motion between the bar 110 and the mass 150 in the region of the mass 150 is a rocking motion.

Figure 8A:
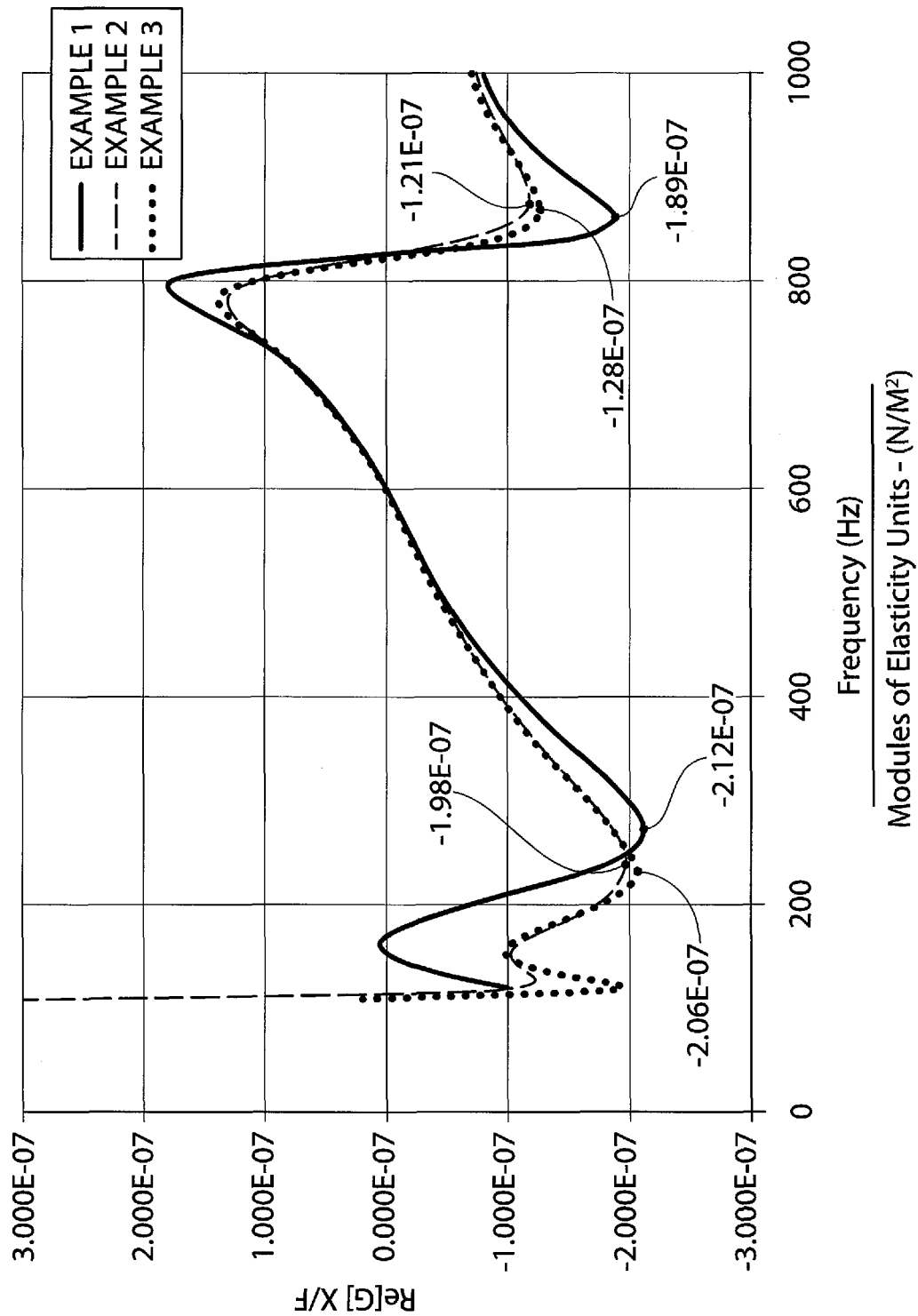
FIG. 8A is a line graph depicting the frequency response for various vibrating boring bars with different dynamic vibration absorbers.
Figure 8B:
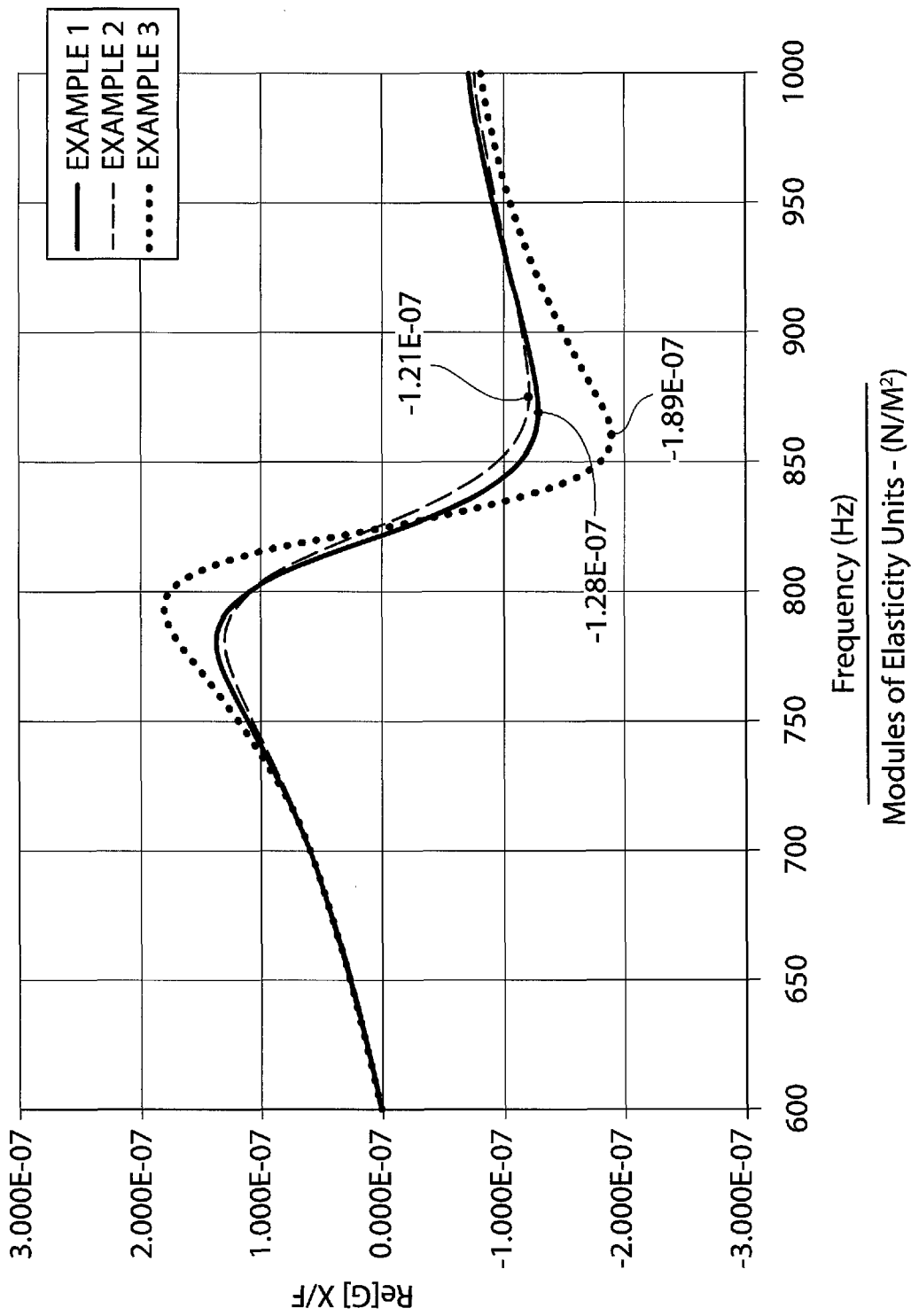
FIG. 8B is an enlargement of the line graph of FIG. 8A in the region of 600-1000 Hz.q3.

With reference to FIGS. 8A and 8B, line graphs showing the frequency responses for a variety of boring bars are illustrated. More specifically, FIG. 8A shows the frequency responses for the vibrating bars between 0 and 1000 Hz. FIG. 8A shows the first and second modes for the vibrating bar. FIG. 8B is an expanded portion of FIG. 8A between 600 and 1000 Hz focusing on the second mode.

Example 1 is a standard tunable boring bar, as is known in the prior art and as depicted in FIGS. 1 and 2. The standard tunable boring bar has an o-ring on each end of the mass. In Example 1, each o-ring is the same stiffness. As shown in FIG. 8A, the frequency response of Example 1 at the first mode is $-2.12*10^{-7}$. As shown in FIGS. 8A and 8B, the frequency response at the second mode is $-1.89*10^{-7}$.

Example 2 is a tunable boring bar that exemplifies features of the present disclosure. Specifically, the bar includes three o-rings. Two of the o-rings are positioned near the distal end of the mass. One o-ring is positioned at the proximal end of the mass. Each o-ring is the same stiffness. Example 2 is similar to the boring bar depicted in FIG. 6. As shown in FIG. 8A, the frequency response of Example 2 at the first mode is $-1.98*10^{-7}$. As shown in FIGS. 8A and 8B, the frequency response at the second mode is $-1.21*10^{-7}$.

Example 3 is another tunable boring bar that exemplifies features of the present disclosure. Specifically, the bar includes two o-rings, each with a different stiffness. The o-ring on the distal end of the mass is 2.09 times stiffer than the o-ring on the proximal end of the mass. Example 3 is similar to the boring bar depicted in FIG. 4. As shown in FIG. 8A, the frequency response of Example 3 at the first mode is $-2.06*10^{-7}$. As shown in FIGS. 8A and 8B, the frequency response at the second mode is $-1.28*10^{-7}$.

As shown in FIGS. 8A and 8B, the absolute value of the frequency response for Examples 2 and 3 are less than the absolute value of the frequency response for a conventional tunable boring bar, such as the boring bar of Example 1. This difference between the bars of the present disclosure and a conventional tunable boring bar is most evident at the second mode, as shown in FIG. 8B.

While several embodiments of the invention are shown in the accompanying figures and described hereinabove in detail, other embodiments will be apparent to, and readily made by, those skilled in the art without departing from the scope and spirit of the invention. For example, it is to be understood that this disclosure contemplates that, to the extent possible, one or more features of any embodiment can be combined with one or more features of any other embodiment. Accordingly, the foregoing description is intended to be illustrative rather than restrictive.

The invention claimed is:

1. A tuned or tunable boring tool comprising:
 a boring bar having a distal portion configured to support a tool, a proximal portion configured for attachment to a support structure of a metalworking machine, and a tubular body extending between the proximal portion and the distal portion, having an elongated cavity therein;
 a dynamic vibration absorber inserted within the elongated cavity of the boring bar, the dynamic vibration absorber comprising:
  a mass that vibrates in conjunction with vibration of the boring bar, the mass having a proximal end, positioned adjacent to the proximal portion of the boring bar, and a distal end, positioned adjacent to the distal portion of the boring bar;
  at least one proximal support, which is resilient, positioned adjacent to and supporting the proximal end of the mass, wherein the at least one proximal support has a stiffness; and at least one distal support, which is resilient, positioned adjacent to and supporting the distal end of the mass, wherein the at least one distal support has a stiffness, wherein the at least one proximal support and at least one distal support have different stiffnesses; and wherein the at least one proximal support comprises a first material, the at least one distal support comprises a second material, and wherein the stiffness of the second material is greater than the stiffness of the first material.

2. The tuned or tunable boring tool of claim 1, wherein the distal support has a greater stiffness than the proximal support.

3. The tuned or tunable boring tool of claim 1, further comprising a proximal pressure plate adjacent to the proximal support and a distal pressure plate adjacent to the distal support for compressing the supports against the respective ends of the mass.

4. The tuned or tunable boring tool of claim 3, further comprising a tuning mechanism associated with the distal pressure plate or the proximal pressure plate for moving the distal pressure plate or the proximal pressure plate to increase or decrease compression of the supports against the mass.

5. The tuned or tunable boring tool of claim 1, where the stiffness of the second material is between about 1.5 times and 2.5 times greater than the stiffness of the first material.

6. The tuned or tunable boring tool of claim 1, wherein the dynamic vibration absorber includes at least two distal supports, each distal support is resilient and comprising a material having a stiffness, and wherein the resultant stiffness of the distal supports is greater than the stiffness of the proximal support.

7. The tuned or tunable boring tool of claim 1, wherein the two distal supports are arranged in a side by side orientation relative to the longitudinal axis of the mass.

8. The tuned or tunable boring tool of claim 1, wherein a number of distal supports is greater than a number of proximal supports.

9. The tuned or tunable boring tool of claim 1, wherein a cross-sectional area of the proximal support is greater than a cross-sectional area of the distal support.

10. The tuned or tunable boring tool of claim 1, wherein the at least one proximal support and at least one distal support comprise annular or partially annular bodies circumscribing at least a portion of the proximal end and distal end of the mass, respectively.

11. The tuned or tunable boring tool of claim 1, wherein the at least one proximal support and the at least one distal support are configured to permit vibration of the mass to cancel or minimize at least the vibration of a second mode of the vibrating boring bar.

12. The tuned or tunable boring tool of claim 1, wherein the mass is at least partially surrounded by a layer of vibration absorbing material to dampen vibration of the mass.

13. The tuned or tunable boring tool of claim 1, wherein at least a portion of the mass is surrounded by a viscous vibration absorbing fluid for absorbing vibration of the mass.

14. The tuned or tunable boring tool of claim 13, wherein the vibration absorbing fluid is natural or synthetic oil.

15. The tuned or tunable boring tool of claim 1, further comprising a cutting element attached to the distal end of the bar.

16. A tuned or tunable boring tool comprising:
a boring bar having a distal portion configured to support a tool, a proximal portion configured for attachment to a support structure of a metalworking machine, and a tubular body extending between the proximal portion and the distal portion, having an elongated cavity therein;
a dynamic vibration absorber inserted within the elongated cavity of the boring bar, the dynamic vibration absorber comprising:
 a mass that vibrates in conjunction with vibration of the boring bar, the mass having a proximal end, positioned adjacent to the proximal portion of the boring bar, and a distal end, positioned adjacent to the distal portion of the boring bar;
 at least one proximal support, which is resilient, positioned adjacent to and supporting the proximal end of the mass, wherein the at least one proximal support has a stiffness; and
 at least one distal support, which is resilient, positioned adjacent to and supporting the distal end of the mass, wherein the at least one distal support has a stiffness,
wherein the at least one proximal support and at least one distal support have different stiffnesses; and
wherein the dynamic vibration absorber includes at least two distal supports, each distal support is resilient and comprising a material having a stiffness, and wherein the resultant stiffness of the distal supports is greater than the stiffness of the proximal support.

17. A tuned or tunable boring tool comprising:
a boring bar having a distal portion configured to support a tool, a proximal portion configured for attachment to a support structure of a metalworking machine, and a tubular body extending between the proximal portion and the distal portion, having an elongated cavity therein;
a dynamic vibration absorber inserted within the elongated cavity of the boring bar, the dynamic vibration absorber comprising:
 a mass that vibrates in conjunction with vibration of the boring bar, the mass having a proximal end, positioned adjacent to the proximal portion of the boring bar, and a distal end, positioned adjacent to the distal portion of the boring bar;
 at least one proximal support, which is resilient, positioned adjacent to and supporting the proximal end of the mass, wherein the at least one proximal support has a stiffness; and
 at least one distal support, which is resilient, positioned adjacent to and supporting the distal end of the mass, wherein the at least one distal support has a stiffness,
wherein the at least one proximal support and at least one distal support have different stiffnesses; and
wherein a number of distal supports is greater than a number of proximal supports.

18. A tuned or tunable boring tool comprising:
a boring bar having a distal portion configured to support a tool, a proximal portion configured for attachment to a support structure of a metalworking machine, and a tubular body extending between the proximal portion and the distal portion, having an elongated cavity therein;
a dynamic vibration absorber inserted within the elongated cavity of the boring bar, the dynamic vibration absorber comprising:
 a mass that vibrates in conjunction with vibration of the boring bar, the mass having a proximal end, positioned adjacent to the proximal portion of the boring bar, and a distal end, positioned adjacent to the distal portion of the boring bar;

at least one proximal support, which is resilient, positioned adjacent to and supporting the proximal end of the mass, wherein the at least one proximal support has a stiffness; and at least one distal support, which is resilient, positioned adjacent to and supporting the distal end of the mass, wherein the at least one distal support has a stiffness, wherein the at least one proximal support and at least one distal support have different stiffnesses; and wherein a cross-sectional area of the proximal support is greater than a cross-sectional area of the distal support.

* * * * *